United States Patent
Fujiwara et al.

(10) Patent No.: US 8,240,131 B2
(45) Date of Patent: Aug. 14, 2012

(54) EXHAUST GAS PURIFYING APPARATUS FOR INTERNAL COMBUSTION ENGINE

(75) Inventors: Takahiko Fujiwara, Susono (JP); Masaaki Kawai, Omaezaki (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 418 days.

(21) Appl. No.: 12/527,919

(22) PCT Filed: Feb. 20, 2008

(86) PCT No.: PCT/JP2008/052824
§ 371 (c)(1), (2), (4) Date: Aug. 20, 2009

(87) PCT Pub. No.: WO2008/102793
PCT Pub. Date: Aug. 28, 2008

(65) Prior Publication Data
US 2010/0011749 A1  Jan. 21, 2010

(30) Foreign Application Priority Data
Feb. 21, 2007  (JP) .................... 2007-040465

(51) Int. Cl.
*F01N 3/18* (2006.01)
(52) U.S. Cl. ........................................... 60/285
(58) Field of Classification Search ............... 60/285, 60/286, 297
See application file for complete search history.

(56) References Cited

U.S. PATENT DOCUMENTS
| | | | |
|---|---|---|---|
| 2004/0045277 A1* | 3/2004 | Tamura | 60/274 |
| 2004/0101453 A1* | 5/2004 | Fujiwara | 422/177 |
| 2007/0298504 A1* | 12/2007 | Mueller et al. | 436/37 |

FOREIGN PATENT DOCUMENTS
| | | |
|---|---|---|
| JP | 60-43113 | 3/1985 |
| JP | 64-3017 | 1/1989 |
| JP | 4-34426 | 3/1992 |
| JP | 2000-265885 | 9/2000 |
| JP | 2003-314257 | 11/2003 |
| JP | 2004-19624 | 1/2004 |
| JP | 2004-108176 | 4/2004 |
| JP | 2004-116320 | 4/2004 |

OTHER PUBLICATIONS
English translation of International Preliminary Report on Patentability, mailed Oct. 15, 2009, for PCT/JP2008/052824.

* cited by examiner

*Primary Examiner* — Thomas Denion
*Assistant Examiner* — Jonathan Matthias
(74) *Attorney, Agent, or Firm* — Finnegan, Henderson, Farabow, Garrett & Dunner, LLP

(57) ABSTRACT

An object of the present invention is to provide an exhaust gas purifying apparatus for an internal combustion engine which can successfully achieve a good balance between reduction of exhaust emission and removal of particulate matter PM. An upstream side three-way catalyst 18 without OSC materials is disposed in an exhaust pipe 14 immediately below an exhaust manifold 12 of an internal combustion engine 10. A particulate filter (PM filter) 20 for trapping the particulate matter PM contained in exhaust gas is disposed at a downstream side of the upstream side three-way catalyst 18. A downstream side three-way catalyst 22 with the OSC materials is disposed at a downstream side of the PM filter 20.

12 Claims, 4 Drawing Sheets

EXHAUST GAS PURIFYING APPARATUS FOR INTERNAL COMBUSTION ENGINE

CROSS-REFERENCE TO RELATED APPLICATIONS

This application is a national phase application of International Application No. PCT/JP2008/052824, filed Feb. 20, 2008, and claims the priority of Japanese Application No. 2007-040465, filed Feb. 21, 2007, the contents of both of which are incorporated herein by reference.

TECHNICAL FIELD

The present invention relates to an exhaust gas purifying apparatus for purifying exhaust gas exhausted from an internal combustion engine.

BACKGROUND ART

An apparatus for purifying exhaust gas including a carbon remover and three-way catalyst at an exhaust outlet in series has been disclosed in the past, for example, by Patent Document 1. The carbon remover has a catalyst layer for removing carbon, and the three-way catalyst has a three-way catalyst layer for oxidizing and reducing nitrogen oxide NOx, hydro carbon HC, and carbon monoxide CO. Such conventional technique can purify ternary components (NOx, HC, CO) and particulate matter PM containing carbon mainly.

Including the above-mentioned document, the applicant is aware of the following documents as a related art of the present invention.
[Patent Document 1] Japanese Laid-open Utility Model Application Publication No. Hei 4-34426
[Patent Document 2] Japanese Laid-open Utility Model Application Publication No. Sho 64-3017
[Patent Document 3] Japanese Laid-open Patent Application Publication No. Sho 60-43113

DISCLOSURE OF INVENTION

Problem to be Solved by the Invention

In an exhaust gas purifying apparatus installed in an exhaust passage of an internal combustion engine, warm-up performance of a catalyst is highly required to reduce exhaust emission, for example, during the cold start. In the foregoing conventional exhaust gas purifying apparatus, however, no considerations are made in terms of achieving a good balance between reduction of exhaust emission by securing the warm-up performance of the catalyst and removal of the particulate matter PM. In this respect, the conventional technique still needs further improvement to implement an exhaust gas purifying apparatus that is capable of successfully achieving a good balance between the reduction of the exhaust emission and the removal of the particulate matter PM.

The present invention has been made to solve the above problem. It is an object of the present invention to provide an exhaust gas purifying apparatus for an internal combustion engine which can successfully achieve a good balance between the reduction of the exhaust emission and the removal of the particulate matter PM.

Means for Solving the Problem

A first aspect of the present invention is an exhaust gas purifying apparatus for an internal combustion engine, the apparatus comprising:
a particulate filter that is disposed in an exhaust passage of the internal combustion engine and traps particulate matter contained in exhaust gas;
an upstream side three-way catalyst that is disposed in the exhaust passage at an upstream side of the particulate filter; and
a downstream side three-way catalyst that is disposed in the exhaust passage at a downstream side of the particulate filter and has an oxygen storage capacity;
wherein the upstream side three-way catalyst has no oxygen storage capacity or has a smaller oxygen storage capacity than the downstream side three-way catalyst.

A second aspect of the present invention is the exhaust gas purifying apparatus for the internal combustion engine according to the first aspect of the present invention, the apparatus further comprising:
an air fuel ratio sensor that is disposed in the exhaust passage at a downstream side of the downstream side three-way catalyst to obtain information on an air fuel ratio of the exhaust gas; and
feedback means for correcting a fuel injection amount on the basis of outputs of the air fuel ratio sensor;
wherein the downstream side three-way catalyst is a catalyst which an amount of oxygen supplied thereto is adjusted by the feedback means.

A third aspect of the present invention is the exhaust gas purifying apparatus for the internal combustion engine according to the second aspect of the present invention, the apparatus further comprising:
an upstream side air fuel ratio sensor that is disposed in the exhaust passage at an upstream side of the upstream side three-way catalyst to obtain information on an air fuel ratio of the exhaust gas;
wherein the feedback means includes main feedback means for correcting a fuel injection amount in such a way that an air fuel ratio of the exhaust gas existing upstream of the upstream side three-way catalyst coincides with a target air fuel ratio on the basis of outputs of the upstream side air fuel ratio sensor, and sub feedback means for modifying contents corrected by the main feedback means based on the outputs of the air fuel ratio sensor.

A fourth aspect of the present invention is the exhaust gas purifying apparatus for the internal combustion engine according to any one of the first to the third aspects of the present invention,
wherein the downstream side three-way catalyst has a larger capacity than the upstream side three-way catalyst.

A fifth aspect of the present invention is the exhaust gas purifying apparatus for the internal combustion engine according to any one of the first to the fourth aspects of the present invention,
wherein a length of the upstream side three-way catalyst is 20 to 50 mm.

A sixth aspect of the present invention is an exhaust gas purifying apparatus for an internal combustion engine, the apparatus comprising:
a catalyst-incorporated particulate filter that is disposed in an exhaust passage of the internal combustion engine, and has a function of trapping particulate matter contained in exhaust gas and a three-way catalyst function; and
a downstream side three-way catalyst that is disposed in the exhaust passage at a downstream side of the catalyst-incorporated particulate filter and has an oxygen storage capacity;
wherein the catalyst-incorporated particulate filter has no oxygen storage capacity or has a smaller oxygen storage capacity than the downstream side three-way catalyst.

A seventh aspect of the present invention is the exhaust gas purifying apparatus for the internal combustion engine according to the sixth aspect of the present invention, the apparatus further comprising:

an air fuel ratio sensor that is disposed in the exhaust passage at a downstream side of the downstream side three-way catalyst to obtain information on an air fuel ratio of the exhaust gas; and feedback means for correcting a fuel injection amount on the basis of outputs of the air fuel ratio sensor;

wherein the downstream side three-way catalyst is a catalyst which an amount of oxygen supplied thereto is adjusted by the feedback means.

An eighth aspect of the present invention is the exhaust gas purifying apparatus for the internal combustion engine according to the seventh aspect of the present invention, the apparatus further comprising:

an upstream side air fuel ratio sensor that is disposed in the exhaust passage at an upstream side of the catalyst-incorporated particulate filter to obtain information on an air fuel ratio of the exhaust gas;

wherein the feedback means includes main feedback means for correcting a fuel injection amount in such a way that an air fuel ratio of the exhaust gas existing upstream of the catalyst-incorporated particulate filter coincides with a target air fuel ratio on the basis of outputs of the upstream side air fuel ratio sensor, and sub feedback means for modifying contents corrected by the main feedback means based on the outputs of the air fuel ratio sensor.

A ninth aspect of the present invention is the exhaust gas purifying apparatus for the internal combustion engine according to the sixth to the eighth aspects of the present invention, wherein the downstream side three-way catalyst has a larger capacity than a portion having the three-way catalyst function in the catalyst-incorporated particulate filter.

A tenth aspect of the present invention is an exhaust gas purifying apparatus for an internal combustion engine, the apparatus comprising:

a particulate filter that is disposed in an exhaust passage of the internal combustion engine and traps particulate matter contained in exhaust gas;

a three-way catalyst that is disposed in the exhaust passage at a downstream side of the particulate filter and has an oxygen storage capacity;

an air fuel ratio sensor that is disposed in the exhaust passage at a downstream side of the three-way catalyst to obtain information on an air fuel ratio of the exhaust gas; and feedback means for correcting a fuel injection amount on the basis of outputs of the air fuel ratio sensor;

wherein the three-way catalyst is a catalyst which an amount of oxygen supplied thereto is adjusted by the feedback means.

An eleventh aspect of the present invention is the exhaust gas purifying apparatus for the internal combustion engine according to the tenth aspect of the present invention, the apparatus further comprising:

an upstream side air fuel ratio sensor that is disposed in the exhaust passage at an upstream side of the particulate filter to obtain information on an air fuel ratio of the exhaust gas;

wherein the feedback means includes main feedback means for correcting a fuel injection amount in such a way that an air fuel ratio of the exhaust gas existing upstream of the particulate filter coincides with a target air fuel ratio on the basis of outputs of the upstream side air fuel ratio sensor, and sub feedback means for modifying contents corrected by the main feedback means based on the outputs of the air fuel ratio sensor.

Advantages of the Invention

According to the first aspect of the present invention, the warm-up performance of the upstream side three-way catalyst at the start can be secured sufficiently, by installing the upstream side three-way catalyst at an uppermost position of an exhaust gas stream. In addition, the particulate filter can be put in an environment in which the particulate filter is exposed to the exhaust gas whose temperature is high, by installing the PM filter at an upstream position following the upstream side three-way catalyst. Further, an environment that is easy to supply oxygen to the particulate filter can be created because a consideration is made in terms of reducing the oxygen storage capacity of the upstream side three-way catalyst placed at the upstream side of the particulate filter compared to that of the downstream side three-way catalyst. Thus the particulate filter PM trapped by the filter can be removed successfully. Furthermore, ability for reducing ternary components (especially NOx) can be secured properly, by installing the downstream side three-way catalyst having the oxygen storage capacity at the downstream side of the particulate filter. In this way, the present invention makes it possible to successfully achieve a good balance between the reduction of the exhaust emission and the removal of the particulate matter PM.

According to the second aspect of the present invention, the particulate filter is disposed at the upstream side of the downstream side three-way catalyst, which is a catalyst containing the oxygen storage capacity and which a supply amount of oxygen thereto is adjusted using the air fuel ratio sensor. This can reduce the exhaust emission (especially NOx), while creating an environment that is capable of supplying a greater amount of oxygen to the particulate filter (that is, while creating an environment that is capable of removing the particulate matter PM more properly), even if the supply amount of oxygen to the downstream side three-way catalyst is adjusted described above. In this way, the present invention makes it possible to achieve the good balance more successfully between the reduction of the exhaust emission and the removal of the particulate matter PM.

According to the third aspect of the present invention, in a situation where the main feedback control using the upstream side air fuel ratio sensor and the sub feedback control using the air fuel ratio sensor (downstream side) are performed, it is possible to achieve the good balance more successfully between the reduction of the exhaust emission and the removal of the particulate matter PM because the consideration according to the first or the second aspect of the present invention is given to the upstream side three-way catalyst, the particulate filter, and the downstream side three-way catalyst placed between those two sensors.

The fourth aspect of the present invention makes it possible to sufficiently secure available oxygen storage capacity for purifying NOx properly and suppress an amount of NOx emission successfully, thereby achieving a well-fulfilled balance between the reduction of the exhaust emission and the removal of the particulate matter PM.

The fifth aspect of the present invention makes it possible to secure the warm-up performance of the upstream side three-way catalyst successfully. Furthermore, the present invention makes it possible to supply a more sufficient amount of oxygen to the particulate filter placed at the downstream side of the upstream side three-way catalyst if the upstream side three-way catalyst has the oxygen storage capacity.

According to the sixth aspect of the present invention, by installing the catalyst-incorporated particulate filter having the three-way catalyst function at an uppermost position of an exhaust gas stream, the warm-up performance of the three-way catalyst of the catalyst-incorporated particulate filter at the start can be secured sufficiently, and the particulate filter can be put in an environment in which the particulate filter is exposed to the exhaust gas whose temperature is high. Further, an environment that is easy to supply oxygen to the particulate filter can be created because a consideration is made in terms of reducing the oxygen storage capacity of the three-way catalyst contained in the catalyst-incorporated particulate filter compared to that of the downstream side three-way catalyst. Thus the particulate filter PM can be removed successfully. Furthermore, ability for reducing ternary components (especially NOx) can be secured properly, by installing the downstream side three-way catalyst having the oxygen storage capacity at the downstream side of the catalyst-incorporated particulate filter. In this way, the present invention makes it possible to successfully achieve a good balance between the reduction of the exhaust emission and the removal of the particulate matter PM.

According to the seventh aspect of the present invention, the catalyst-incorporated particulate filter is disposed at the upstream side of the downstream side three-way catalyst, which is a catalyst containing the oxygen storage capacity and which a supply amount of oxygen thereto is adjusted using the air fuel ratio sensor. This can reduce the exhaust emission (especially NOx), while creating an environment that is capable of supplying a greater amount of oxygen to the catalyst-incorporated particulate filter (that is, while creating an environment that is capable of removing the particulate matter PM more properly), even if the supply amount of oxygen to the downstream side three-way catalyst is adjusted described above. In this way, the present invention makes it possible to achieve the good balance more successfully between the reduction of the exhaust emission and the removal of the particulate matter PM.

According to the eighth aspect of the present invention, in a situation where the main feedback control using the upstream side air fuel ratio sensor and the sub feedback control using the air fuel ratio sensor (downstream side) are performed, it is possible to achieve the good balance more successfully between the reduction of the exhaust emission and the removal of the particulate matter PM because the consideration according to the sixth or the seventh aspect of the present invention is given to the catalyst-incorporated particulate filter and the downstream side three-way catalyst placed between those two sensors.

The ninth aspect of the present invention makes it possible to sufficiently secure available oxygen storage capacity for purifying NOx properly and suppress an amount of NOx emission successfully, thereby achieving a well-fulfilled balance between the reduction of the exhaust emission and the removal of the particulate matter PM.

According to the tenth aspect of the present invention, the particulate filter can be put in an environment in which the particulate filter is exposed to the exhaust gas whose temperature is high, by installing the PM filter at an upstream side of the three-way catalyst. Thus the particulate filter PM can be removed successfully. In addition, according to the present invention, the particulate filter is disposed at the upstream side of the downstream side three-way catalyst, which is a catalyst containing the oxygen storage capacity and which a supply amount of oxygen thereto is adjusted using the air fuel ratio sensor. This can reduce the exhaust emission (especially NOx), while creating an environment that is capable of supplying a greater amount of oxygen to the particulate filter (that is, while creating an environment that is capable of removing the particulate matter PM more properly), even if the supply amount of oxygen to the downstream side three-way catalyst is adjusted described above. In this way, the present invention makes it possible to achieve the good balance more successfully between the reduction of the exhaust emission and the removal of the particulate matter PM.

According to the eleventh aspect of the present invention, in a situation where the main feedback control using the upstream side air fuel ratio sensor and the sub feedback control using the air fuel ratio sensor (downstream side) are performed, it is possible to achieve the good balance more successfully between the reduction of the exhaust emission and the removal of the particulate matter PM because the consideration according to the tenth aspect of the present invention is given to the catalyst-incorporated particulate filter and the three-way catalyst placed between those two sensors.

DESCRIPTION OF SYMBOLS

Figure 1:
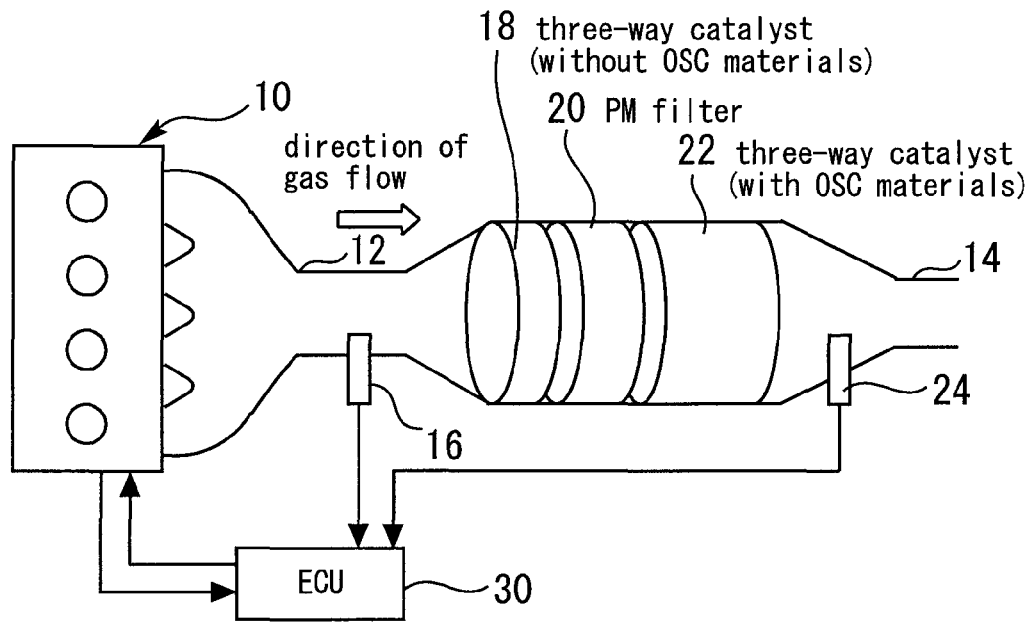
FIG. 1 is a diagram explaining an exhaust gas purifying apparatus for an internal combustion engine according to a first embodiment of the present invention.

10 internal combustion engine
12 exhaust manifold
14 exhaust pipe
16 main linear A/F sensor
18 upstream side three-way catalyst
20 particulate filter (PM filter)
22 downstream side three-way catalyst
24 sub O2 sensor
30 Electronic Control Unit (ECU)
40 catalyst-incorporated PM filter
50 three-way catalyst

BEST MODE FOR CARRYING OUT THE INVENTION

First Embodiment

FIG. 1 is a diagram explaining an exhaust gas purifying apparatus for an internal combustion engine according to a first embodiment of the present invention. As shown in FIG. 1, the exhaust gas purifying apparatus of the present embodiment is disposed in an exhaust passage of the internal combustion engine 10. It is assumed herein that the internal combustion engine 10 of the present embodiment is a spark-ignited internal combustion engine that uses gasoline as a fuel.

The exhaust passage of the internal combustion engine 10 includes an exhaust manifold 12 that is connected to each cylinder of the internal combustion engine, and an exhaust pipe 14 that is connected to the exhaust manifold 12. The exhaust gas exhausted from all cylinders are gathered by the exhaust manifold 12 and exhausted into the exhaust pipe 14 via the exhaust manifold 12. A main linear A/F sensor (hereinafter simply abbreviated as a "A/F sensor") 16 is disposed in the exhaust manifold 12 to detect an exhaust air fuel ratio at its own position. The A/F sensor 16 is a sensor that issues an output generally linear with respect to the air fuel ratio of the exhaust gas.

An upstream side three-way catalyst 18 that is capable of purifying ternary components (NOx, HC, CO) contained in the exhaust gas is disposed at a downstream side of the A/F sensor 16, on the other hand, disposed in the exhaust pipe 14 immediately below the exhaust manifold 12. The upstream side three-way catalyst 18 is configured as a three-way catalyst without oxygen storage/release materials (hereinafter simply abbreviated as an "OSC (Oxygen Storage Capacity) materials") such as ceria. That is to say, the upstream side three-way catalyst 18 is configured as a three-way catalyst without the oxygen storage capacity. The upstream side three-way catalyst 18 is configured in such a way that a length (length in the direction of an exhaust gas stream) thereof becomes 20 to 50 mm.

A particulate filter (hereinafter referred to as a "PM filter") 20 that is capable of trapping and removing particulate matter PM contained in the exhaust gas is disposed in a downstream side of the upstream side three-way catalyst 18. PM trapped by the PM filter 20 is burned and removed when the PM filter 20 is put in a high-temperature environment. The PM filter 20 is configured in such a way that a capacity thereof becomes 0.1 to 0.5 times larger than a displacement volume of the internal combustion engine 10. The PM filter 20 is coated with a Pt-based noble metal. Applying the noble metal on the PM filter 20 in such a manner can lower a combustion temperature of PM by approximately 50 degrees C., when compared to a situation where the noble metal is not applied. This makes it possible to burn and remove PM in a state where a floor temperature of the PM filter 20 is relatively low (approximately 550 degrees C.) when compared to the situation where the noble metal is not applied.

A downstream side three-way catalyst 22 that is capable of purifying the above ternary components contained in the exhaust gas is disposed in a downstream side of the PM filter 20. Unlike the upstream side three-way catalyst 18, the downstream side three-way catalyst 22 is configured as a three-way catalyst containing the OSC materials such as ceria. That is to say, the downstream side three-way catalyst 22 is configured as a three-way catalyst having the oxygen storage capacity. The downstream side three-way catalyst 22 is configured in such a way that a capacity thereof becomes 1.5 to 2.5 times larger than that of the upstream side three-way catalyst 18.

A sub O2 sensor 24 is disposed in a downstream side of the downstream side three-way catalyst 22 to make a signal in response to whether an air fuel ratio at its own position is rich or lean.

The system of the present embodiment includes an electronic control unit (ECU) Various sensors (not shown) as well as the A/F sensor 16 and sub O2 sensor 24 mentioned above are connected to the ECU 30 to control the internal combustion engine 10. In addition, various actuators (not shown) such as a throttle valve, a fuel injection valve, an ignition plug, and the like are connected to the ECU 30.

The system of the internal combustion engine 10 including the exhaust gas purifying apparatus for the present embodiment that has been described above, performs a main feedback control based on the output of the upstream side A/F sensor 16, and performs a sub feedback control based on the output of the downstream side sub O2 sensor 24. In the main feedback control, an amount of fuel injection is controlled to allow the air fuel ratio of the exhaust gas flowing into the upstream side three-way catalyst 18 to agree with a control target air fuel ratio. In the sub feedback control, contents of the main feedback control are corrected so that the air-fuel ratio of the exhaust gas flowing out downstream of the downstream side three-way catalyst 22 may become the stoichiometric air fuel ratio. By performing such feedback controls (especially, the feedback control using the downstream side sub O2 sensor 22), the ECU 30 can adjust an amount of oxygen supplied to the downstream side three-way catalyst 22.

[Advantages of the Exhaust Gas Purifying Apparatus According to the First Embodiment]

In the exhaust gas purifying apparatus of the present embodiment that has been described above, considerations concerning the following three viewpoints, more specifically, a consideration for improving a warm-up performance of a three-way catalyst (upstream side three-way catalyst 18), a consideration for removing PM, and a consideration for suppressing NOx emission are given.

This makes it possible to reduce the ternary components (NOx, HC, CO) contained in the exhaust gas and PM at the same time.

Hereinafter, each consideration will be described in detail.

(1) Consideration for Improving the Warm-up Performance of a Three-way Catalyst (Upstream Side Three-way Catalyst)

In the internal combustion engine 10 that is a gasoline engine, reducing exhaust emission (especially HC) during the cold start is required. In the present embodiment described above, the upstream side three-way catalyst 18 is disposed at the upstream side of the PM filter 20. By such a layout, thermal energy of the exhaust gas exhausted from the cylinder is directly given to the upstream side three-way catalyst 18 first, thereby securing the warm-up performance of the upstream side three-way catalyst 18 sufficiently.

Figure 2:
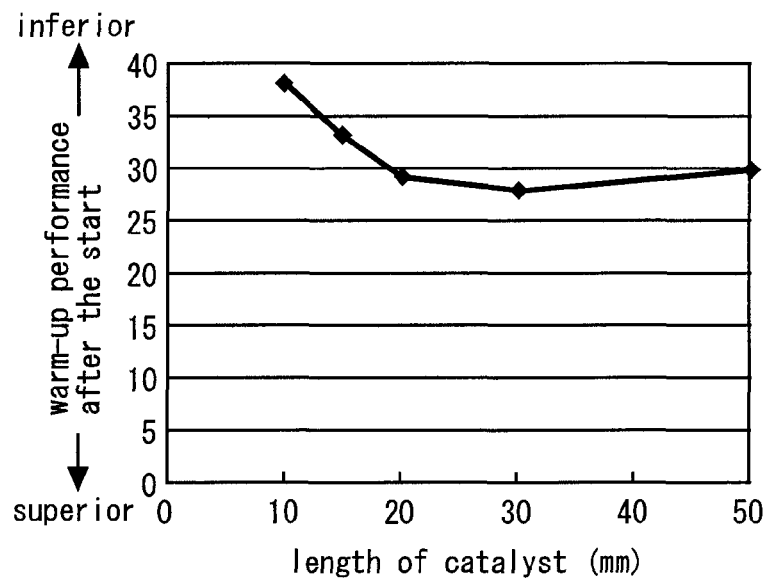
FIG. 2 is a diagram showing warm-up performance after the start in relationship with a length of an upstream side three-way catalyst.

FIG. 2 is a diagram showing the warm-up performance after the start in relationship with a length of the upstream side three-way catalyst. FIG. 2 indicates that the warm-up performance at the start is deteriorated if the length of the upstream side three-way catalyst 18 becomes shorter than 20 mm. The reason comes from the fact that a sufficient catalytic reaction cannot progress inside of the catalyst if the length of the catalyst is not sufficient, and that sufficient reaction heat for the warm-up of the catalyst cannot be obtained. In the present embodiment described above, the upstream side three-way catalyst 18 is configured in such a way that the length thereof becomes 20 to 50 mm. In this respect, the above configurations also contribute to the improvement of warm-up performance of the upstream side three-way catalyst 18.

(2) Consideration (Consideration for being Capable of Successfully Supplying Oxygen to the PM Filter 20) for Removing PM First, in the present embodiment described above, in order that the PM filter 20 may be disposed as upstream as possible, the PM filter 20 is disposed at a position closer to the combustion chamber of the internal combustion engine 10 following the upstream side three-way catalyst 18 placed at the uppermost stream position. As described above, PM trapped by the PM filter 20 can be burned and removed under a condition where the floor temperature thereof is equal to or higher than 550 degrees C. According to such a layout of the PM filter 20, the PM filter 20 can be exposed to the exhaust gas whose temperature is as high as possible. This makes it possible to create an environment that is capable of burning and removing PM continuously. As a result, variations of pressure loss inside the exhaust pipe 14 due to accumulation of PM can be suppressed.

In order to burn and remove PM by putting the PM filter 20 in the high-temperature environment, oxygen must exist in atmosphere of the PM filter 20. Unlike a diesel engine being operated generally in a state where an amount of the air is excess, all of oxygen is basically consumed by the combustion, in the internal combustion engine 10 that is a gasoline engine being operated generally in a state where the air fuel ratio is controlled to be stoichiometric. For this reason, a situation where oxygen is hard to exist in the exhaust gas exhausted from the cylinder is brought. Consequently, in order to be able to remove PM successfully in such a gasoline engine, it is important to create an environment that is capable of supplying oxygen to the PM filter 20.

First, in the present embodiment, in order to create an environment that is capable of supplying a greater amount of oxygen to the PM filter 20, the upstream side three-way catalyst 18 without the OSC materials is disposed at the upstream side of the PM filter 20 as described above, and the downstream side three-way catalyst 22 with the OSC materials is disposed at the downstream side of the PM filter 20. This makes it possible to facilitate the supply of oxygen to the PM filter 20.

Furthermore, in the present embodiment, in order to create the environment that is capable of supplying a greater amount of oxygen to the PM filter 20, the PM filter 20 is disposed at the upstream side of the downstream side three-way catalyst 22 (and the sub O2 sensor 24) in which a supply amount of oxygen is adjusted in accordance with the outputs of the sub O2 sensor 24 placed at the downstream side of the downstream side three-way catalyst 22. In the feedback control using the sub O2 sensor 24, feedback controls of the fuel injection amount are performed in such a way that the air fuel ratio of the exhaust gas becomes lean if the outputs of the sub O2 sensor 24 is reversed to a rich output state, and that the air fuel ratio of the exhaust gas becomes rich if the outputs of the sub O2 sensor 24 is reversed to a lean output state. For this reason, if a PM filter is disposed at a downstream side of a three-way catalyst containing the OSC materials such as the downstream side three-way catalyst 18, oxygen does not flow into the downstream side of the three-way catalyst during a period during which the oxygen storage capacity of the three-way catalyst containing the OSC materials is enough, even if a condition (that is, a condition including a great amount of oxygen) where the air fuel ratio of the exhaust gas exhausted from the cylinder is a value leaner than stoichiometric is formed.

As a result, it is difficult to secure sufficient time when the PM filter placed at the downstream side of the three-way catalyst is exposed to the exhaust gas (the lean atmosphere) containing oxygen. In contrast, according to the alignment order of the present embodiment, the PM filter 20 is disposed at the upstream side of the downstream side three-way catalyst 22, which is a catalyst containing the OSC materials and to which the feedback control using the sub O2 sensor 24 is applied. Therefore, it is possible to create the environment that is capable of supplying a greater amount of oxygen to the PM filter 20, even if such feedback control is performed (furthermore, even if the main feedback control using the A/F sensor 16 and the sub feedback control using the sub O2 sensor are performed).

As described above, by installing the PM filter 20 at the position at which the PM filter 20 is exposed to the exhaust gas whose temperature is as high as possible and by creating the above environment for supplying oxygen, the configurations of the present embodiment can remove PM successfully even if the gasoline engine that is difficult to secure sufficient oxygen because the air fuel ratio is basically controlled to become the stoichiometric air fuel ratio is applied.

(3) Consideration for Suppressing NOx Emission

In the present embodiment described above, the PM filter 20, the downstream side three-way catalyst 22 which contains the OSC materials and in which the supply amount of oxygen is controlled using the sub O2 sensor 24, and the sub O2 sensor 24 are disposed in order from the upper side of the exhaust gas stream. This makes it possible to successfully achieve a good balance between maintenance of the environment for supplying oxygen to the PM filter 20 and reduction of the exhaust emission (especially NOx).

Figure 3:
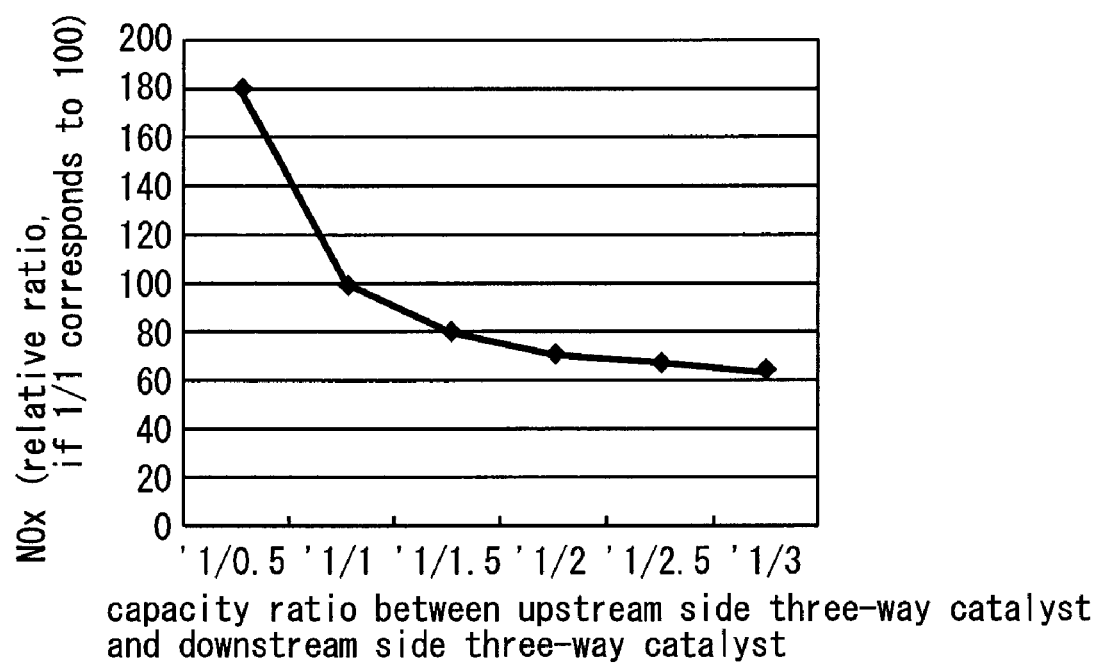
FIG. 3 is a diagram showing a capacity ratio between the upstream side three-way catalyst and a downstream side three-way catalyst in relationship with an amount of NOx emission.

FIG. 3 is a diagram showing a capacity ratio between the upstream side three-way catalyst 18 and the downstream side three-way catalyst 22 in relationship with an amount of the NOx emission. Incidentally, FIG. 3 assumes that the amount of the NOx emission if the capacity ratio between the upstream side three-way catalyst 18 and the downstream side three-way catalyst 22 is one-to-one is 100, and represents a relationship between the capacity ratio and the amount of the NOx emission (relative ratio).

FIG. 3 indicates that the amount of the NOx emission is reduced if the capacity of the downstream side three-way catalyst 22 is larger than that of the upstream side three-way catalyst 18, when compared to the case in which the capacity ratio is one-to-one. In the present embodiment, the capacity of the downstream side three-way catalyst 22 is set so as to become 1.5 to 2.5 times as large as that of the upstream side three-way catalyst 18. Therefore, the amount of the NOx emission can be reduced successfully. In addition, reduction reaction for NOx which progresses inside the three-way catalysts 18, 22 requires a longer reaction time than oxidation reaction. Therefore, the downstream side three-way catalyst 22 having the foregoing capacity ratio can sufficiently secure available oxygen storage capacity to purify NOx properly, and can suppress the amount of the NOx emission successfully.

(4) Another Advantage

The oxygen storage capacity obtained by involving the OSC materials in the three-way catalyst can be used as an index that shows a deterioration level of the three-way catalyst. According to the configurations of the present embodiment, it is also possible to secure detection performance (OBD detection performance) of deterioration of the catalyst using the oxygen storage capacity, by involving the OSC materials in the downstream side three-way catalyst 22.

(5) Summary

The exhaust gas purifying apparatus of the present embodiment that has been described above can successfully achieve a good balance among securement of the warm-up performance of the three-way catalyst (upstream side three-way catalyst 18) at the start, removal of PM, and reduction of the exhaust emission such as NOx, even if the gasoline engine that is difficult to secure oxygen in the exhaust pipe 14 is applied.

In the first embodiment, which has been described above, the upstream side three-way catalyst 18 does not contain the OSC materials (that is, the upstream side three-way catalyst 18 has no oxygen storage capacity). However, in the present invention, a consideration concerning the oxygen storage capacity given to the upstream side three-way catalyst and downstream side three-way catalyst for securing supply of oxygen to the PM filter 20 is not limited to the foregoing method. More specifically, as far as the oxygen storage capacity of the upstream side three-way catalyst is smaller than that of the downstream side three-way catalyst, the upstream side three-way catalyst may have a smaller amount of the OSC materials than the downstream side three-way catalyst.

Figure 4:
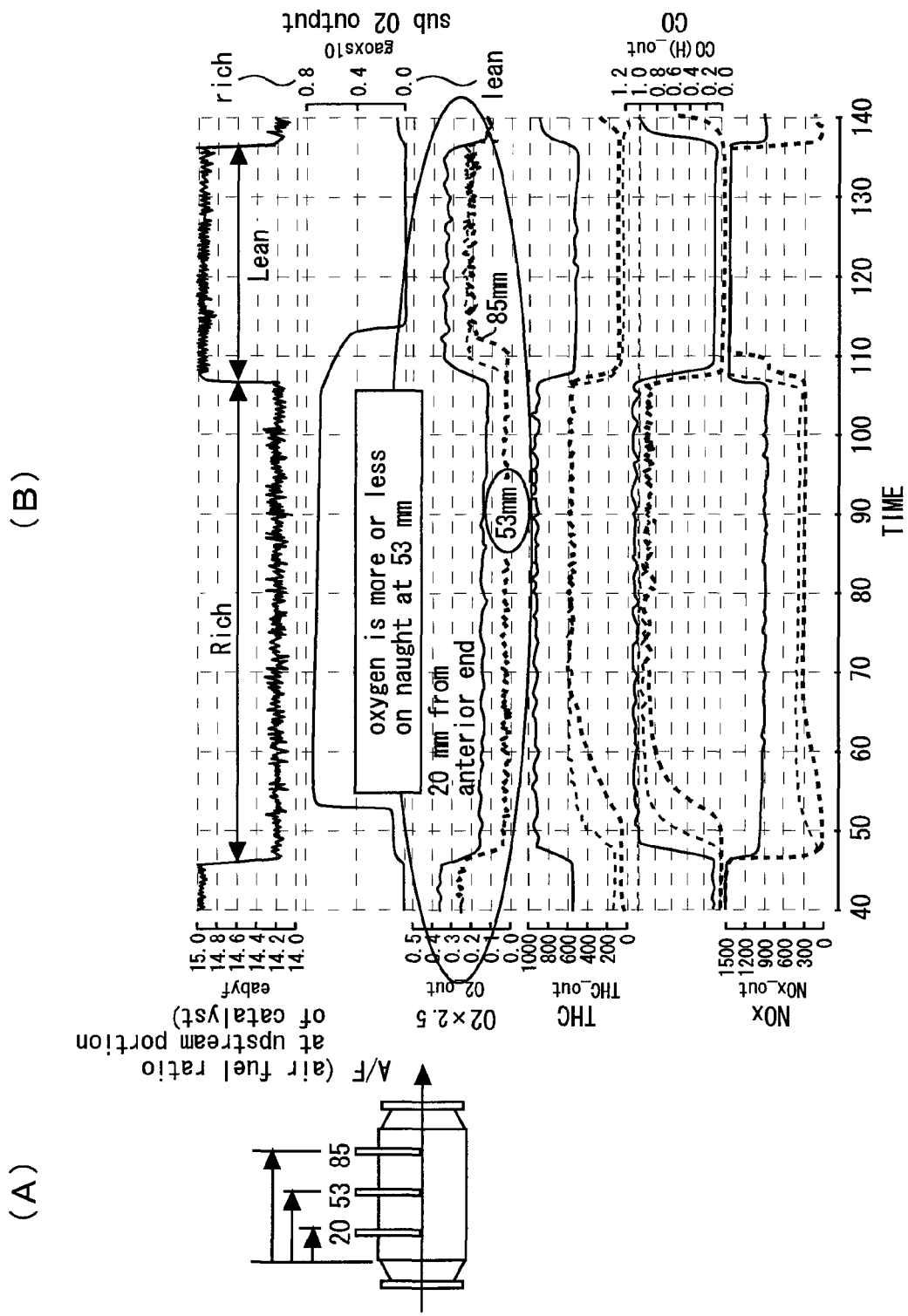
FIG. 4 is a diagram showing a behavior of various components (oxygen O2, THC, CO, NOx) contained in exhaust gas flowing out of a three-way catalyst when an air fuel ratio of the exhaust gas is switched alternatively between rich and lean.

If the upstream side three-way catalyst contains the OSC materials as described above, setting the length of the upstream side three-way catalyst to 20 to 50 mm (equal to or less than 50 mm) as is the case with the above-described first embodiment contributes to creating the environment that is capable of securing the supply of oxygen to the PM filter 20 for the following reason. FIG. 4 is a diagram showing a behavior of various components (oxygen O2, THC, CO, NOx) contained in the exhaust gas flowing out of the three-way catalyst when the air fuel ratio of the exhaust gas is switched alternatively between rich and lean. Incidentally, FIG. 4(B) shows examination results existing when laboratory experiments are performed with three types of three-way catalysts whose lengths are 20 mm, 53 mm, and 85 mm, respectively, as shown in FIG. 4(A). In FIG. 4(B), the waveform corresponding to the catalyst whose length is 20 mm is denoted by a solid line; the waveform corresponding to the catalyst whose length is 53 mm is denoted by a thin broken line; and the waveform corresponding to the catalyst whose length is 85 mm is denoted by a thick broken line.

The examination results shown in FIG. 4(B) indicates that in a condition where the three-way catalyst is exposed to a rich atmosphere (oxygen lack condition), oxygen stored by the three-way catalyst under previous lean atmosphere compared to the above rich atmosphere disappears due to reaction between HC and CO if the length of the catalyst becomes longer than 50 mm. Therefore, in respect of suppressing the foregoing oxygen consumption, setting the length of the upstream side three-way catalyst to 20 to 50 mm (equal to or less than 50 mm or so) is effective to create the environment that is capable of supplying a greater amount of oxygen to the PM filter 20 provided at the downstream side of the upstream side three-way catalyst.

Incidentally, in the first embodiment, which has been described above, the sub O2 sensor 24 corresponds to the "air fuel ratio sensor" according to the second aspect of the present invention. In addition, the "feedback means" according to the second aspect of the present invention is implemented when the ECU 30 performs the main feedback control and the sub feedback control.

Further, the main linear A/F sensor 16 corresponds to the "upstream side air fuel ratio sensor" according to the third aspect of the present invention. In addition, the "main feedback means" according to the third aspect of the present invention is implemented when the ECU 30 performs the main feedback control using the outputs of the main linear A/F sensor 16; and the "sub feedback means" according to the third aspect of the present invention is implemented when the ECU 30 performs the sub feedback control using the outputs of the sub O2 sensor 24.

Second Embodiment

A second embodiment of the present invention will now be described with reference to FIG. 5.

Figure 5:
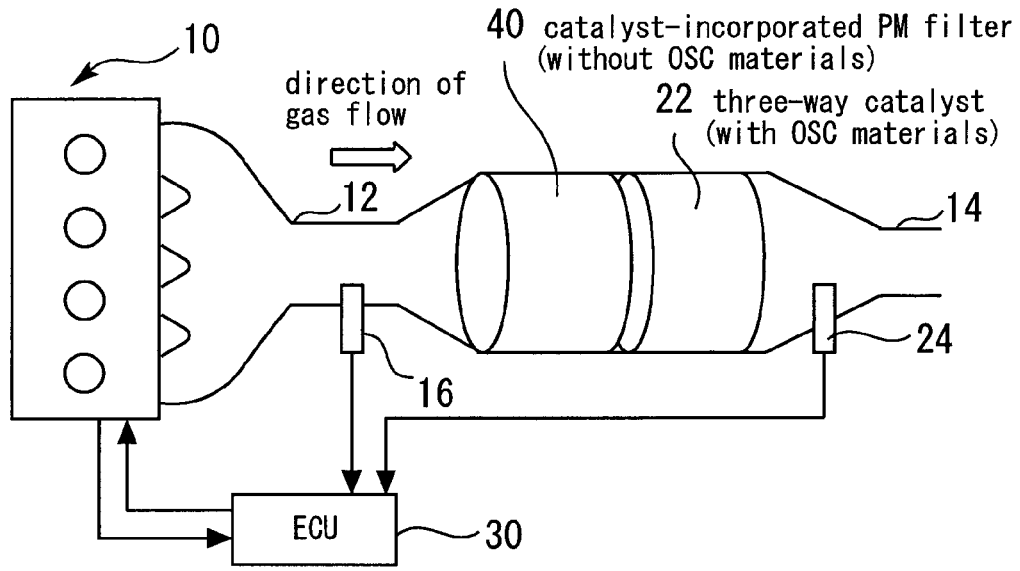
FIG. 5 is a diagram explaining an exhaust gas purifying apparatus for an internal combustion engine according to a second embodiment of the present invention.

FIG. 5 is a diagram explaining an exhaust gas purifying apparatus for an internal combustion engine according to a second embodiment of the present invention. As regards the elements in FIG. 5 that are the same as those in FIG. 1, their description is omitted or abridged with the same reference numerals assigned.

The exhaust gas purifying apparatus shown in FIG. 5 has the same configurations as those of the first embodiment described above, except for a point that constituent elements corresponding to the upstream side three-way catalyst 18 and the PM filter 20 in the first embodiment are integrated and configured as a catalyst-incorporated PM filter 40 having a three-way catalyst function and a function of a PM filter. More specifically, the catalyst-incorporated PM filter 40 is configured by supporting the three-way catalyst by the PM filter 20.

That is to say, in the present embodiment, the catalyst-incorporated PM filter 40 and the downstream side three-way catalyst 22 are disposed in order from the upper side of the exhaust gas stream. In addition, the supply amount of oxygen to the downstream side three-way catalyst 22 is adjusted using the sub O2 sensor 24 placed at the downstream side of the downstream side three-way catalyst 22. Further, the downstream side three-way catalyst 22 has a larger capacity than a portion having the three-way catalyst function in the catalyst-incorporated particulate filter 40. Incidentally, as is the case with the modified embodiment associated with the first embodiment described above, the catalyst-incorporated PM filter 40 may have a smaller amount of the OSC materials than the downstream side three-way catalyst 22.

The configurations of the second embodiment that has been described above can provide the same advantages as those of the above-described first embodiment.

Third Embodiment

A third embodiment of the present invention will now be described with reference to FIG. 6.

Figure 6:
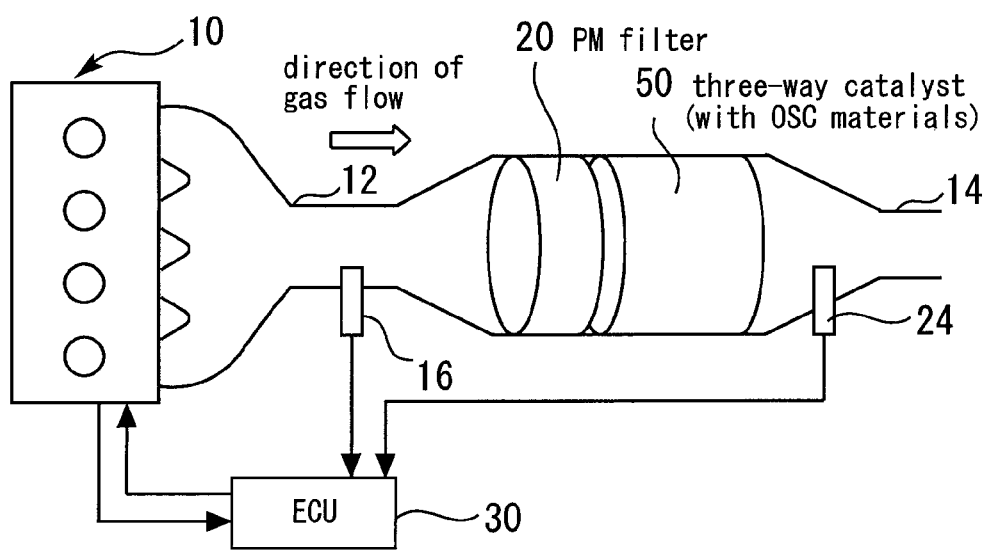
FIG. 6 is a diagram explaining an exhaust gas purifying apparatus for an internal combustion engine according to a third embodiment of the present invention.

FIG. 6 is a diagram explaining an exhaust gas purifying apparatus for an internal combustion engine according to a third embodiment of the present invention.

As regards the elements in FIG. 6 that are the same as those in FIG. 1, their description is omitted or abridged with the same reference numerals assigned.

The exhaust gas purifying apparatus shown in FIG. 6 has the same configurations as those of the first embodiment described above, except for a point that the upstream side three-way catalyst 18 without the OSC materials is not provided at the upstream side of the PM filter 20. More specifically, in the present embodiment, the PM filter 20 and a three-way catalyst 50 with the OSC materials (that is, with the oxygen storage capacity) are disposed in order from the upper side of the exhaust gas stream. In addition, the supply amount of oxygen to the three-way catalyst 50 is adjusted using the sub O2 sensor 24 placed at the downstream side of the three-way catalyst 50.

According to the configurations of the third embodiment that has been described above, the PM filter 20 can be exposed to the exhaust gas whose temperature is as high as possible, by installing the PM filter 20 at the upstream side of the three-way catalyst 50. Further, according to the configurations of the present embodiment, the PM filter 20 is disposed at the upstream side of the three-way catalyst 50, which is a catalyst containing the OSC materials and to which the feedback control using the sub O2 sensor 24 is applied. Therefore, it is possible to create the environment that is capable of supplying a greater amount of oxygen to the PM filter 20, for the reason described above, even if the above-described feedback control is performed.

Consequently, the configurations of the present embodiment makes it possible to successfully achieve a good balance between removal of PM and reduction of the exhaust emission (especially NOx), even if the gasoline engine that is difficult to secure sufficient oxygen because the air fuel ratio is basically controlled to become the stoichiometric air fuel ratio is applied. In addition, it is also possible to secure detection performance (OBD detection performance) of deterioration of the catalyst using the oxygen storage capacity, by involving the OSC materials in the three-way catalyst 50.

In the first to the third embodiments, which have been described above, a plurality of catalysts and a particulate filter, such as the upstream side three-way catalyst 18, PM filter 20, and the downstream side three-way catalyst 22 are installed in one casing placed at the exhaust pipe 14. However, a catalyst and a particulate filter of the present invention need not always be installed in one casing, as far as the alignment order concerning the catalyst and particulate filter of the present invention is kept. For example, each catalyst and a particulate filter may be installed in each casing.

The invention claimed is:

1. An exhaust gas purifying apparatus for an internal combustion engine that uses control for providing a stoichiometric air fuel ratio as basic control for an air fuel ratio, the apparatus comprising:
   a particulate filter that is disposed in an exhaust passage of the internal combustion engine and traps particulate matter contained in exhaust gas;
   an upstream side three-way catalyst that is disposed in the exhaust passage at an upstream side of the particulate filter;
   a downstream side three-way catalyst that is disposed in the exhaust passage at a downstream side of the particulate filter and has an oxygen storage capacity;
   an air fuel ratio sensor that is disposed in the exhaust passage at a downstream side of the downstream side three-way catalyst to obtain information on an air fuel ratio of the exhaust gas; and
   feedback means for correcting a fuel injection amount on the basis of outputs of the air fuel ratio sensor;
   wherein the upstream side three-way catalyst has no oxygen storage capacity; and
   wherein the downstream side three-way catalyst is a catalyst which an amount of oxygen supplied thereto is adjusted by the feedback means.

2. The exhaust gas purifying apparatus for the internal combustion engine according to claim 1, the apparatus further comprising:
   an upstream side air fuel ratio sensor that is disposed in the exhaust passage at an upstream side of the upstream side three-way catalyst to obtain information on an air fuel ratio of the exhaust gas;
   wherein the feedback means includes main feedback means for correcting a fuel injection amount in such a way that an air fuel ratio of the exhaust gas existing upstream of the upstream side three-way catalyst coincides with a target air fuel ratio on the basis of outputs of the upstream side air fuel ratio sensor, and sub feedback means for modifying contents corrected by the main feedback means based on the outputs of the air fuel ratio sensor.

3. The exhaust gas purifying apparatus for the internal combustion engine according to claim 1,
   wherein the downstream side three-way catalyst has a larger capacity than the upstream side three-way catalyst.

4. The exhaust gas purifying apparatus for the internal combustion engine according to claim 1,
   wherein a length of the upstream side three-way catalyst is 20 to 50 mm.

5. The exhaust gas purifying apparatus for the internal combustion engine according to claim 1, wherein the air fuel ratio sensor includes a sub $O_2$ sensor.

6. An exhaust gas purifying apparatus for an internal combustion engine that uses control for providing a stoichiometric air fuel ratio as basic control for an air fuel ratio, the apparatus comprising:
   a particulate filter that is disposed in an exhaust passage of the internal combustion engine and traps particulate matter contained in exhaust gas;
   an upstream side three-way catalyst that is disposed in the exhaust passage at an upstream side of the particulate filter;
   a downstream side three-way catalyst that is disposed in the exhaust passage at a downstream side of the particulate filter and has an oxygen storage capacity;
   an air fuel ratio sensor that is disposed in the exhaust passage at a downstream side of the downstream side three-way catalyst to obtain information on an air fuel ratio of the exhaust gas; and
   a controller configured to correct a fuel injection amount on the basis of outputs of the air fuel ratio sensor;
   wherein the upstream side three-way catalyst has no oxygen storage capacity; and
   wherein the downstream side three-way catalyst is a catalyst which an amount of oxygen supplied thereto is adjusted by the controller.

7. The exhaust gas purifying apparatus for the internal combustion engine according to claim 6, wherein the air fuel ratio sensor includes a sub $O_2$ sensor.

8. An exhaust gas purifying apparatus for an internal combustion engine that uses control for providing a stoichiometric air fuel ratio as basic control for an air fuel ratio, the apparatus comprising:
   a catalyst-incorporated particulate filter that is disposed in an exhaust passage of the internal combustion engine, and has a function of trapping particulate matter contained in exhaust gas and a three-way catalyst function;
   a downstream side three-way catalyst that is disposed in the exhaust passage at a downstream side of the catalyst-incorporated particulate filter and has an oxygen storage capacity;
   an air fuel ratio sensor that is disposed in the exhaust passage at a downstream side of the downstream side three-way catalyst to obtain information on an air fuel ratio of the exhaust gas; and
   feedback means for correcting a fuel injection amount on the basis of outputs of the air fuel ratio sensor;
   wherein the catalyst-incorporated particulate filter has no oxygen storage capacity;
   wherein the downstream side three-way catalyst is a catalyst which an amount of oxygen supplied thereto is adjusted by the feedback means; and
   wherein the downstream side three-way catalyst has a larger capacity than a portion having the three-way catalyst function in the catalyst-incorporated particulate filter.

9. The exhaust gas purifying apparatus for the internal combustion engine according to claim 8, the apparatus further comprising:
   an upstream side air fuel ratio sensor that is disposed in the exhaust passage at an upstream side of the catalyst-incorporated particulate filter to obtain information on an air fuel ratio of the exhaust gas;
   wherein the feedback means includes main feedback means for correcting a fuel injection amount in such a way that an air fuel ratio of the exhaust gas existing upstream of the catalyst-incorporated particulate filter coincides with a target air fuel ratio on the basis of outputs of the upstream side air fuel ratio sensor, and sub feedback means for modifying contents corrected by the main feedback means based on the outputs of the air fuel ratio sensor.

10. The exhaust gas purifying apparatus for the internal combustion engine according to claim 8, wherein the air fuel ratio sensor includes a sub $O_2$ sensor.

11. An exhaust gas purifying apparatus for an internal combustion engine that uses control for providing a stoichiometric air fuel ratio as basic control for an air fuel ratio, the apparatus comprising:

a catalyst-incorporated particulate filter that is disposed in an exhaust passage of the internal combustion engine, and has a function of trapping particulate matter contained in exhaust gas and a three-way catalyst function;

a downstream side three-way catalyst that is disposed in the exhaust passage at a downstream side of the catalyst-incorporated particulate filter and has an oxygen storage capacity;

an air fuel ratio sensor that is disposed in the exhaust passage at a downstream side of the downstream side three-way catalyst to obtain information on an air fuel ratio of the exhaust gas; and a cotroller configured to correct a fuel injection amount on the basis of outputs of the air fuel ratio sensor;

wherein the catalyst-incorporated particulate filter has no oxygen storage capacity;

wherein the downstream side three-way catalyst is a catalyst which an amount of oxygen supplied thereto is adjusted by the controller; and wherein the downstream side three-way catalyst has a larger capacity than a portion having the three-way catalyst function in the catalyst-incorporated particulate filter.

12. The exhaust gas purifying apparatus for the internal combustion engine according to claim 11, wherein the air fuel ratio sensor includes a sub $O_2$ sensor.

* * * * *